US010914750B2

(12) United States Patent
Kosaka et al.

(10) Patent No.: US 10,914,750 B2
(45) Date of Patent: Feb. 9, 2021

(54) SAMPLE PROCESSING SYSTEM AND CONTROL METHOD

(71) Applicant: Hitachi, Ltd., Tokyo (JP)

(72) Inventors: Nozomu Kosaka, Tokyo (JP); Toshiya Sakamaki, Tokyo (JP); Yukiko Sagawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 274 days.

(21) Appl. No.: 16/098,725

(22) PCT Filed: Apr. 20, 2017

(86) PCT No.: PCT/JP2017/015868
§ 371 (c)(1),
(2) Date: Nov. 2, 2018

(87) PCT Pub. No.: WO2017/191761
PCT Pub. Date: Nov. 9, 2017

(65) Prior Publication Data
US 2019/0137527 A1    May 9, 2019

(30) Foreign Application Priority Data
May 6, 2016  (JP) .................................. 2016-093032

(51) Int. Cl.
*G01N 35/00*      (2006.01)
(52) U.S. Cl.
CPC ............................ *G01N 35/00584* (2013.01)
(58) Field of Classification Search
CPC ............................................. G01N 35/00584
See application file for complete search history.

(56) References Cited

U.S. PATENT DOCUMENTS

| 6,023,399 A | 2/2000 | Kogure |
| 8,423,989 B2* | 4/2013 | Fedok ................. G06F 9/44505 |
| | | 717/168 |
| 2003/0204525 A1 | 10/2003 | Toume et al. |
| 2007/0239829 A1* | 10/2007 | Verseput ................. G06F 30/00 |
| | | 709/204 |
| 2012/0096919 A1* | 4/2012 | Choikhet ............... G01N 30/24 |
| | | 73/1.02 |
| 2014/0157875 A1 | 6/2014 | Yamamoto |

FOREIGN PATENT DOCUMENTS

| JP | H09-274044 A | 10/1997 |
| JP | H10-262093 A | 9/1998 |
| JP | 2001-159635 A | 6/2001 |
| JP | 2003-098180 A | 4/2003 |
| JP | 2003-316576 A | 11/2003 |
| JP | 2009-047592 A | 3/2009 |

OTHER PUBLICATIONS

International Search Report dated Aug. 1, 2017 in PCT/JP2017/015868.

* cited by examiner

*Primary Examiner* — Shogo Sasaki
(74) *Attorney, Agent, or Firm* — Foley & Lardner LLP (57) ABSTRACT

A center processor generates multiple instruction strings from sequence data based on a conversion table. The multiple instruction strings are transmitted to multiple local units via an internal network. Each of the local units includes a local processor and an I/O board. Layers from an internal layer to an input/output layer form a common platform.

10 Claims, 10 Drawing Sheets

| LOGICAL ADDRESS | PHYSICAL ADDRESS | |
|---|---|---|
| LOGICAL NAME | LOCAL UNIT ID (PACKET DESTINATION) | PHYSICAL NAME WITHIN LOCAL UNIT |
| MOTOR a | 1 | MOTOR 1 |
| MOTOR b | 2 | MOTOR 1 |
| ... | ... | ... |

SAMPLE PROCESSING SYSTEM AND CONTROL METHOD

TECHNICAL FIELD

The present invention relates to a sample processing system, and more particularly to a basic technique (platform) to be used when a large number of instruments are controlled in accordance with sequence data.

BACKGROUND ART

A sample processing system is composed of one or multiple devices for processing a sample. As the devices, a transporting device, a centrifugal separator, an unplugging device, a pipetting device, a plugging device, an analyzer, and the like are known (refer to Patent Literature 1 (PTL 1) and Patent Literature 2 (PTL 2)). The sample to be processed is a body fluid (for example, blood) collected from a biological body. Normally, in the sample processing system, multiple samples are transported on a rack basis.

An entire set (for example, an entire blood collection tube) of a sample and a container storing the sample is referred to as sample in some cases. A child sample generated by pipetting from a parent sample is a type of a sample. A portion (portion composed of a transporting device, a centrifugal separator, an unplugging device, a pipetting device, and the like) for executing a preprocess on a sample before analysis is referred to as sample preprocessing system. The sample preprocessing system is a type of a sample processing system.

When the sample processing system is composed of multiple devices, sequence data (sequence program) is normally prepared for each of the devices, and each of the devices is controlled in accordance with the sequence data. Each of the devices includes a large number of instruments (a sensor, a switch, an electromagnetic valve, a pump, a motor, a barcode reader, and the like) to be controlled. The sequence data is a program defining operations of the instruments.

Specific configurations and arrangements of the instruments are different for the instruments. Thus, in general, a dedicated control board for controlling multiple instruments is installed in each of the devices. The control boards are electronic circuit boards that interpret and execute the sequence data, generate signals to be output to the instruments, and process signals from the devices.

CITATION LIST

Patent Literature

PTL 1: Japanese Patent Application Laid-Open No. 2001-159635
PTL 2: Japanese Patent Application Laid-Open No. 2003-98180

SUMMARY OF INVENTION

Technical Problem

When dedicated control boards are prepared for respective devices forming a sample processing system, the development cost increases. In addition, in this configuration, the control boards need to be replaced with other control boards for each change in specifications. In addition, sequence data needs to be rewritten. Configurations of control boards may be the same between the multiple devices. However, when many functions are implemented on each of control boards from an initial state, many circuits that are actually not used exist and are not useful. Furthermore, there is a problem that wirings extending from the control boards to instruments are long and complex within the devices.

An object of the present invention is to achieve a platform for a sample processing system having high general versatility, high flexibility, and high extensibility. Alternatively, an object of the present invention is to make hardware configurations between multiple devices common as much as possible.

Alternatively, an object of the present invention is to make the modification of sequence data unnecessary even when the arrangement of instruments is changed or the like. Alternatively, an object of the present invention is to simplify wirings in individual devices.

Solution to Problem (1) A sample processing system according to an embodiment includes at least one device including multiple instruments for processing a sample. At least one instrument group is defined for the multiple instruments, and the device includes a center unit configured to generate an instruction string based on sequence data, and a local unit connected to the instrument group and configured to control the instrument group by executing an instruction string whose destination is the local unit. The center unit includes a conversion table to be used to identify, for each logical name identifying an instrument to be controlled, a local unit and a physical name corresponding to the logical name, and generating means configured to generate the instruction string by determining, based on the conversion table, a local unit configured to transmit an instruction based on a logical name within the instruction included in the sequence data and converting the logical name included in the instruction to a physical name.

According to the aforementioned configuration, the generating means included in the center unit generates the instruction string to be given to the local unit based on the sequence data. In this case, the conversion table is referenced, the local unit to which the instruction is given is determined based on the logical name within the instruction included in the sequence data, and the physical name within the local unit is determined. The conversion table indicates correspondence relationships between multiple logical addresses (logical names) and multiple physical addresses (pairs of local units and physical names). In general, the logical addresses abstractly identify instruments to be controlled. The physical addresses identify actual locations at which the instruments to be controlled are exist. The local unit controls the instrument group managed by the local unit by interpreting and executing the instruction string whose destination is the local unit.

In the aforementioned configuration, the center unit and the local unit are installed between the sequence data and the multiple instruments, or a layered structure is used. In the generation of the sequence data, since the instruments to be controlled can be identified or described using the logical names, the sequence data is generated without recognizing positions at which the instruments to be controlled are installed and the local unit managing the instruments. In addition, for example, a specific instrument included in a certain instrument group is moved to another instrument group (or administration is changed), it is sufficient if information of the specific instrument is rewritten in the conversion table, and the sequence data does not need to be rewritten. In addition, according to the aforementioned configuration, it is easy to install the local unit near the instrument group. In this case, the lengths of signal lines between the local unit and the instrument group can be short, and entire wirings can be simplified. This is a great advantage upon the assembly maintenance of the device.

The aforementioned layered structure can be used regardless of the use and functions of each device forming the sample processing system and has general versatility. In addition, even when the number of instrument groups is increased, it is normally sufficient if the number of local units is increased and it can be said that flexibility and extensibility are high. The layered structure may be used as a platform common to multiple devices forming a sample processing system.

In the embodiment, multiple instrument groups may be defined for the multiple instruments, and the device may include multiple local units corresponding to the multiple instrument groups. The center unit may generate multiple instruction strings to be given to the multiple local units based on the sequence data. From a perspective of positional closeness, it is desirable that grouping be executed.

In the embodiment, the device may include an internal network installed between the center unit and the multiple local units. The multiple instruction strings may be transmitted from the center unit to the multiple local units via the internal network. Since the internal network is installed, the internal network can be used even upon a change in the number of local units. A communication scheme (for example, a token scheme (token system)) for avoiding collision of transmitted data may be used. To prevent control from being delayed in each local unit, a sufficiently high-speed internal network may be used as the internal network.

In the embodiment, packet communication may be executed between the center unit and the multiple local units via the internal network, and the generating means may determine a packet destination based on a logical name within an instruction included in the sequence data. In the packet communication, even when a large number of units are connected in the network, information can be accurately efficiently transmitted and received. Obviously, a communication scheme other than the packet communication can be used.

In the embodiment, the local unit may include a local controller board having mounted thereon a local processor for executing an instruction string that has been transmitted from the center unit and whose destination is the local unit, and an I/O board connected to the local controller board and configured to generate a signal string to be output to the instrument group in accordance with control by the local processor and process a signal string received from the instrument group.

The local processor interprets and executes individual instructions and actually controls the instruments. When multiple local units exist, instruction information included in the sequence data is discretely processed in parallel by multiple local processors. Preferably, I/O boards function as relay boards having mounted thereon drivers, I/F circuits, and the like. Preferably, rated signals are transmitted from the local processors to the I/O boards. Based on the signals, signals to drive instruments are generated in the I/O boards. In addition, preferably, signals received from the instruments are converted to rated signals in the I/O boards, and the rate signals are to be transmitted to the local processors.

In the embodiment, the sample processing system may include multiple devices. Each of the devices may include the center unit and include the local controller board and the I/O board as the local unit. The center units included in the multiple devices have the same hardware configuration. The local controller boards included in the multiple devices have the same hardware configuration. The cost of the system can be significantly reduced by making components common. Preferably, the multiple I/O boards installed in the multiple devices have the same hardware configuration.

In the embodiment, the local controller board may include a first connector. The I/O board may include a second connector connected directly to the first connector or connected indirectly to the first connector via a cable. According to this configuration, the controller board is standardized, and a configuration of the I/O board can be easily changed based on a configuration of the instrument group. It is desirable to concentrate various input and output connectors on the I/O board. A power source connector may not be included in the connectors. Since a network cable needs to be connected to the local controller board, it is desirable to install a connector for the connection on the local controller board.

In the embodiment, the local units may be installed at positions corresponding to the instrument groups in the device. Thus, the multiple local units may be distributed and installed in the device, and network cables for connecting the center unit to the multiple local units are installed in the device. In the embodiment, the positions corresponding to the instrument groups are positions located near the instrument groups.

(2) A method according to the embodiment is to be executed for each of multiple devices in a sample processing system including the multiple devices for processing a sample. Each of the devices include a center unit configured to generate an instruction string based on sequence data, a local unit connected to an instrument group of multiple instruments, and an internal network to be used to execute communication between the center unit and the local unit. An instrument to be controlled is identified by a logical name within an instruction included in the sequence data. The control method includes the steps of causing each of the center units included in the devices to generate the instruction string by determining a local unit configured to transmit an instruction based on a logical name within the instruction included in the sequence data and converting the logical name included in the instruction to a physical name, and causing each of the local units included in the devices to execute an instruction string whose destination is the local unit and control the multiple instruments.

A program for executing the aforementioned control method may be installed in each of the devices via a storage medium or a network. The layered structure is applicable to another medical system and another processing system other than the sample processing system.

DESCRIPTION OF EMBODIMENT

Hereinafter, an embodiment of the present invention is described based on the accompanying drawings.

Figure 1:
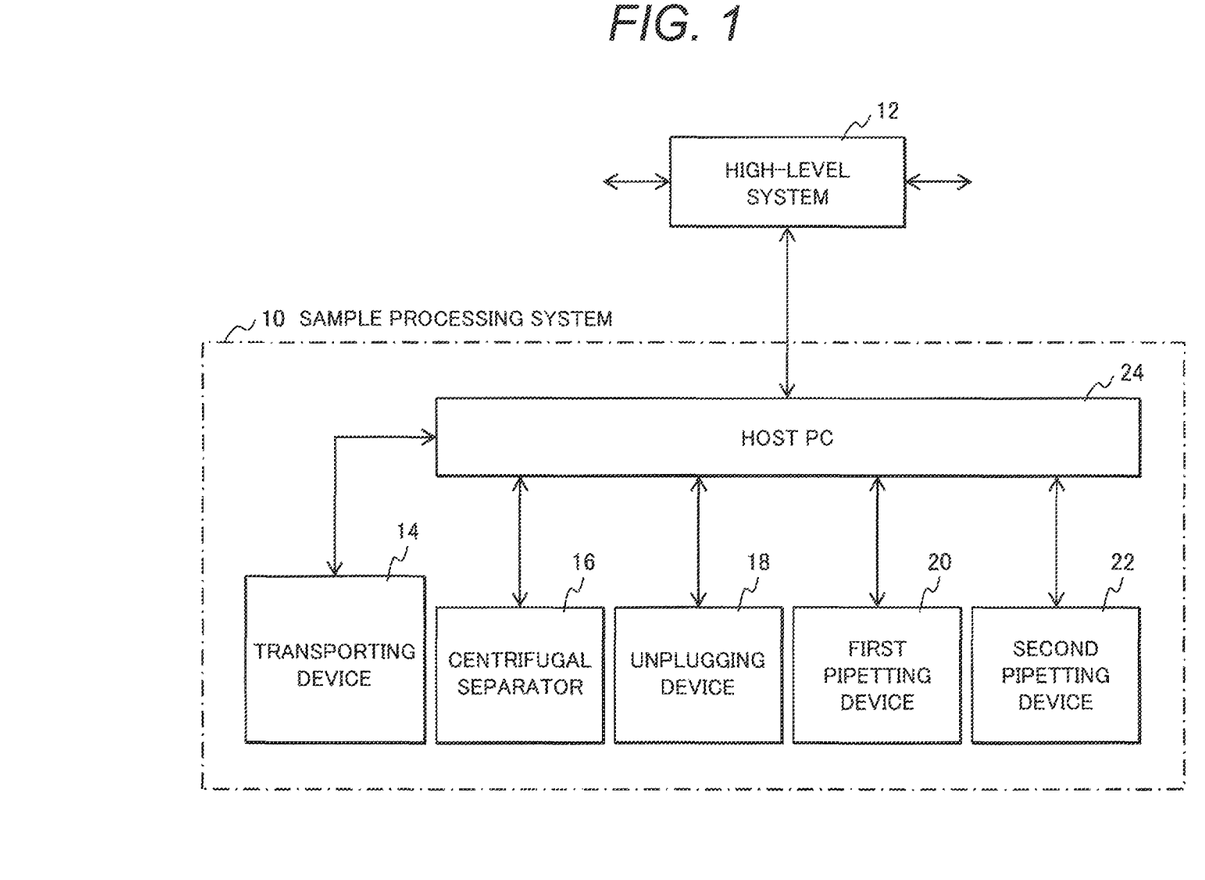
FIG. 1 is a block diagram showing a preferred embodiment of a sample processing system according to the present invention.

FIG. 1 shows a sample processing system according to the embodiment of the invention. FIG. 1 is a block diagram showing an entire configuration of the sample processing system. The sample processing system 10 is installed in a medical institution such as a blood center, a hospital, or a clinical laboratory and configured to execute preprocessing on each sample. The sample processing system 10 includes multiple devices. Specifically, the sample processing system 10 includes a transporting device 14, a centrifugal separator 16, an unplugging device 18, a first pipetting device 20, and a second pipetting device 22.

The transporting device 14 is a device for transporting a rack across the multiple devices 16 to 22. As a method for the transportation, a conveyor transportation method or the like is known. A predetermined number (for example, 10) of samples are held in each of racks. The samples are, for example, blood collection tubes. Blood collected from human bodies is stored in the blood collection tubes. In a system for processing other samples (or other target objects), a control platform described later may be introduced.

The centrifugal separator 16 is a device for executing a centrifugal separation process on blood within the blood collection tubes. The centrifugal separator 16 includes multiple buckets and a rotor for rotating the buckets. The unplugging device 18 is a device for removing plugs installed at upper openings of the blood collection tubes from the blood collection tubes after the centrifugal separation before a pipetting process. As the plugs, metallic foil sealing plugs, rubber plugs, or the like are known.

The first pipetting device 20 and the second pipetting device 22 suction serum from the blood collection tubes as parent samples and inject the serum into multiple containers (multiple child sample containers). Each of the pipetting devices 20 and 22 includes one or multiple nozzles for suctioning a sample. A resin nozzle chip attachable to and detachable from an edge of a metal pipe may be used. By operating the two pipetting devices 20 and 22 in parallel, the number of samples to be processed per unit of time can be increased. One or multiple analyzers may be coupled to each other at a rear stage of a sample preprocessing device.

The host PC 24 is an information processing device that gives data necessary for control to the multiple devices 14 to 22 and manages them as needed. It is connected to a high-level system 12. The high-level system 12 transmits, to the host PC 24, various types of information on samples to be processed. The devices 14 to 22 transmit information indicating processing results and status information to the host PC 24.

The configuration shown in FIG. 1 and the aforementioned operations are examples. The sample processing system 10 may include more devices or may include only a single device.

Figure 2:
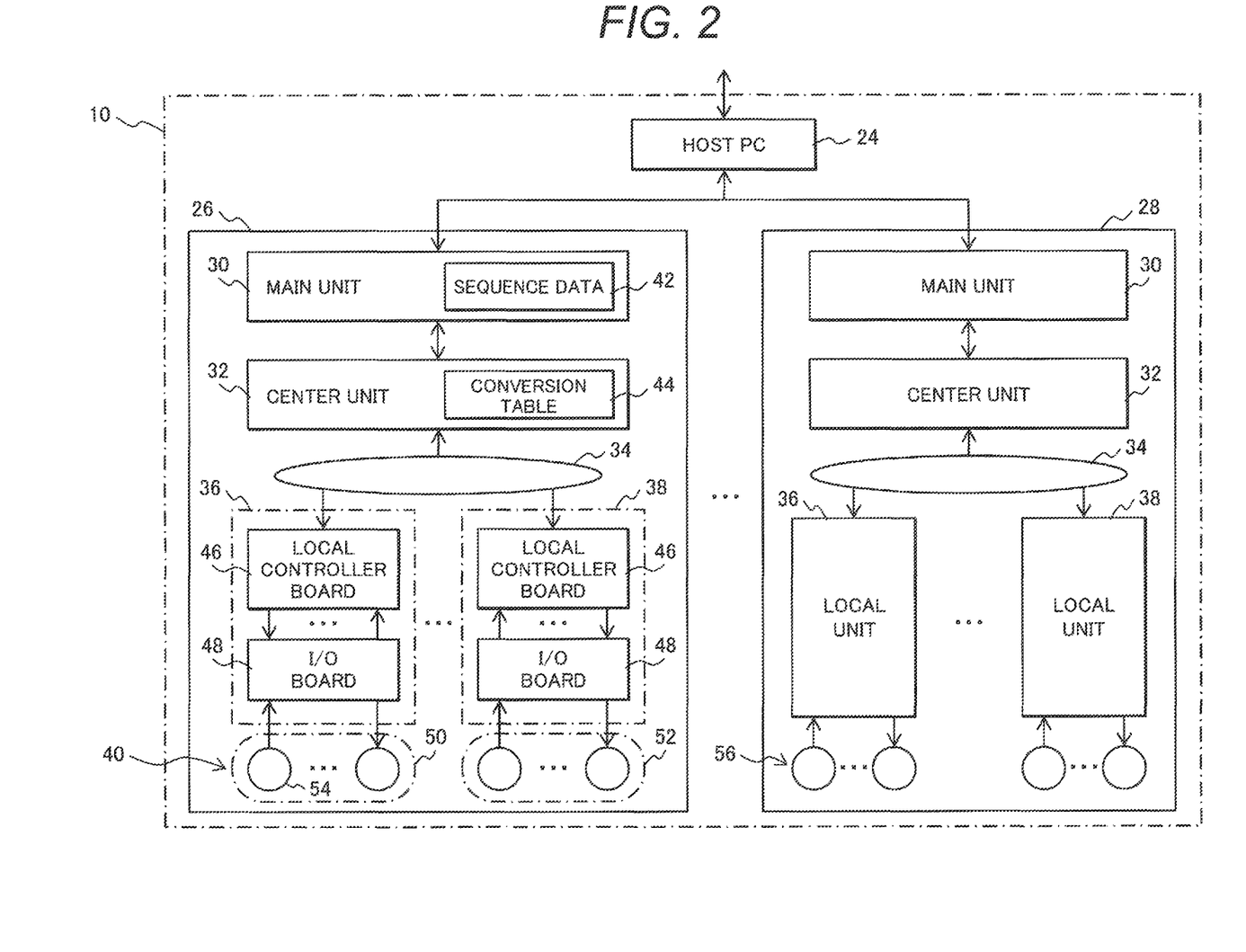
FIG. 2 is a block diagram showing an example of a configuration of the sample processing system shown in FIG. 1.

FIG. 2 exemplifies a detailed configuration of the sample processing system 10 shown in FIG. 1. The sample processing system 10 shown in FIG. 2 includes multiple devices 26 and 28. The devices 26 and 28 correspond to the centrifugal separator 16, the unplugging device 18, the first pipetting device 20, and the second pipetting device 22, which are shown in FIG. 1, or correspond to another device (for example, the analyzer). From a perspective of control of multiple instruments, the devices 26 and 28 have basically the same configuration. The device 26 is described below.

The device 26 includes a main unit 30, a center unit 32, an internal network 34, multiple local units 36 and 38, multiple physical instruments (instrument array) 40, and the like. The instruments 54 are, for example, a sensor, a switch, a motor, a pump, an electromagnetic valve, a barcode reader (BCR), and the like. The instruments are mainly classified into an instrument group (the motor, the pump, and the like) to be controlled in accordance with a given control signal, and an instrument group (the sensor, the switch, and the like) configured to generate and output a signal. In any case, the instruments are targets to be controlled.

In the configuration example shown in FIG. 2, multiple instrument groups 50 and 52 are defined for the multiple instruments 40 included in the device 26. As described later, a single local unit (for example, the local unit 36) corresponds to a single instrument group (for example, the instrument group 50). Conversely, multiple instruments connected to and managed by a single local unit form a single instrument group. It is desirable that grouping be executed so that multiple instruments close to each other in distance form a single instrument group. The grouping, however, may be executed from a perspective of the use of an available resource, the distribution of power, and the like. In the present embodiment, there are one-on-one correspondence relationships between the multiple local units 36 and 38 and the multiple instrument groups 50 and 52.

For example, tens to hundreds of instruments are installed in the device 26, and a configuration for controlling the instruments is a configuration in a range from the main unit 30 to the local units 36 and 38. The configuration has a layered structure described later, and the layered structure can be understood as a platform. The layered structure is described in detail later.

The main unit 30 is configured as a CPU board. The CPU board is an electronic circuit board on which multiple electronic components including a CPU are mounted. The main unit 30 includes sequence data 42. Specifically, the main unit 30 includes a storage unit storing the sequence data 42. The storage unit is, for example, a nonvolatile memory or a hard disk. The sequence data is a program or instruction string in which details of operations of the device 26 and details of control of the device 26 are described. Each of instructions is composed of a command, an object, a parameter, and the like. In the present embodiment, in the sequence data, the objects are identified as logical names or identified by logical addresses. In other words, the sequence data can be generated without recognizing the local units managing the objects and actual instrument addresses in the local units.

The center unit 32 is configured as an electronic circuit board on which multiple electronic components including a processor are mounted. The center unit 32 generates, based on the sequence data, multiple instruction strings to be given to the multiple local units 36 and 38. Specifically, a center processor shown in FIG. 4 generates the multiple instruction strings or functions as generating means. In FIG. 2, a conversion table 44 is referenced upon the generation of the multiple instruction strings. Actually, the conversion table 44 is stored in a memory included in the center unit 32. The memory is a nonvolatile memory and is, for example, an EEROM. The conversion table 44 indicates correspondence relationships between multiple logical addresses and multiple physical addresses, as described later. The conversion table 44 is also referred to as mapping table. The logical addresses are addresses abstractly identifying instruments to be controlled. In the present embodiment, logical names are used as the logical addresses. The physical addresses are addresses concretely identifying actual locations at which the instruments to be controlled exist. In the present embodiment, as the physical addresses, combinations (pairs) of local unit identifiers and physical names within the local units are used.

According to the conversion table 44, a local unit managing a certain instrument can be identified from a logical name of the certain instrument, and a physical name within the local unit can be simultaneously identified. According to the conversion table 44, the logical name can be identified from the local unit and the physical name. Since the conversion table 44 is used, there is an advantage that the sequence data 42 is generated without recognizing the physical addresses of the instruments and the like. In addition, when the administration of a certain instrument by a local unit is cancelled and the certain instrument is managed by another local unit, it is possible to obtain an advantage that it is sufficient if the correspondence relationships indicated in the conversion table are partially modified and that the sequence data does not need to be rewritten.

Multiple main units having the same configuration may be arranged in parallel and execute assigned processes for speed up or other purposes. In addition, the center unit 32 may include a function of executing a function, a function of loading a macro instruction, and the like. The center unit 32 can be understood as middleware or an API (Application Programming Interface).

The internal network 34 is configured to execute high-speed packet communication between the center unit 32 and the multiple local units 36 and 38. Actually, multiple network cables are installed across the multiple units 32, 36, and 38. To avoid collision of data in the internal network 34, a token scheme is used in the present embodiment. Specifically, a token is circulated in a token ring. Only a unit that has received the token obtains the right to access or the right to transmit information. Obviously, another communication scheme can be used. For example, a communication scheme for executing arbitration when collision occurs may be used. The center unit 32 transmits an instruction string to the local units 36 and 38 via the internal network 34. The local units 36 and 38 transmit information such as status information to the center unit 32 via the internal network 34. When communication (for example, transmission and reception of a timing signal) between the multiple local units 36 and 38 is required, the communication may be executed using the internal network 34 or may be executed using one or multiple input and output ports of the I/O boards 48.

The multiple local units 36 and 38 have basically the same configuration. As the I/O boards 48 described later, customized dedicated boards may be used. In the present embodiment, the local units 36 and 38 are hardware modules composed of multiple electronic circuit boards. The local unit 36 is representative of the multiple local units 36 and 38, and a configuration of the local unit 36 is described below.

The local unit 36 includes a local controller board 46 and an I/O board 48. In the present embodiment, the local controller board 48 is configured as a single electronic circuit board. A local processor as a local controller and the like are amounted on the local controller board. Individual instructions forming an instruction string are sequentially interpreted and executed by the local processor. By executing this, signals for controlling the individual instruments are generated. In addition, signals are received by the local processor from the individual instruments. The local processor is composed of one or multiple devices such as a CPU and an FPGA. The signals output from the local controller board 46 and the input signals received by the local controller are rated signals. The input and output signals of the local controller board are digital signals or voltage signals, each of which indicates 1 or 0 as a voltage value. The local controller board 46 may be configured to generate an analog signal and receive an analog signal. The number (maximum number) of general-purpose inputs and outputs of the local processor is defined to be in a range of tens to one hundred and several tens. In addition, the local processor includes several general-purpose or dedicated ports.

The I/O board 48 is configured as a single electronic circuit board in the present embodiment. The I/O board 48 has mounted thereon a circuit (driver or the like) for generating signals to be transmitted to instruments such as the motor, pump, electromagnetic valve, and the like included in the instrument group 50. In addition, the I/O board 48 has mounted thereon input circuits (ADC, level converting circuit, and the like) for processing signals transmitted by the sensor, switch, and the like included in the instrument group 50. The I/O board 48 can be referred to as I/F board. As described above, the multiple local controller boards 46 of the multiple local units 36 and 38 have the same hardware configuration. Hardware configurations of the multiple I/O boards 48 of the multiple local units 36 and 38 may be standardized, but may be different from each other.

The device 28 has basically the same hardware configuration as the device 26, except for configurations of multiple instruments 56. Specifically, the device 28 includes a main unit 30, a center unit 32, an internal network 34, and multiple local units 36 and 38. Normally, the multiple instruments 56 managed by the device 28 are different from the multiple instruments 40 managed by the device 26. Thus, the number of instrument groups of the device 28 is different from the number of instrument groups of the device 26 in many cases. Thus, the number of local units of the device 26 is different from the number of local units of the device 28 in many cases. One or multiple instrument groups are defined for each of the devices 26 and 28 in consideration of the configurations of the multiple instruments 40 and 56. Specifically, the numbers of necessary local units are defined. A control operation in the device 28 is the same as a control operation in the device 26.

Figure 3:
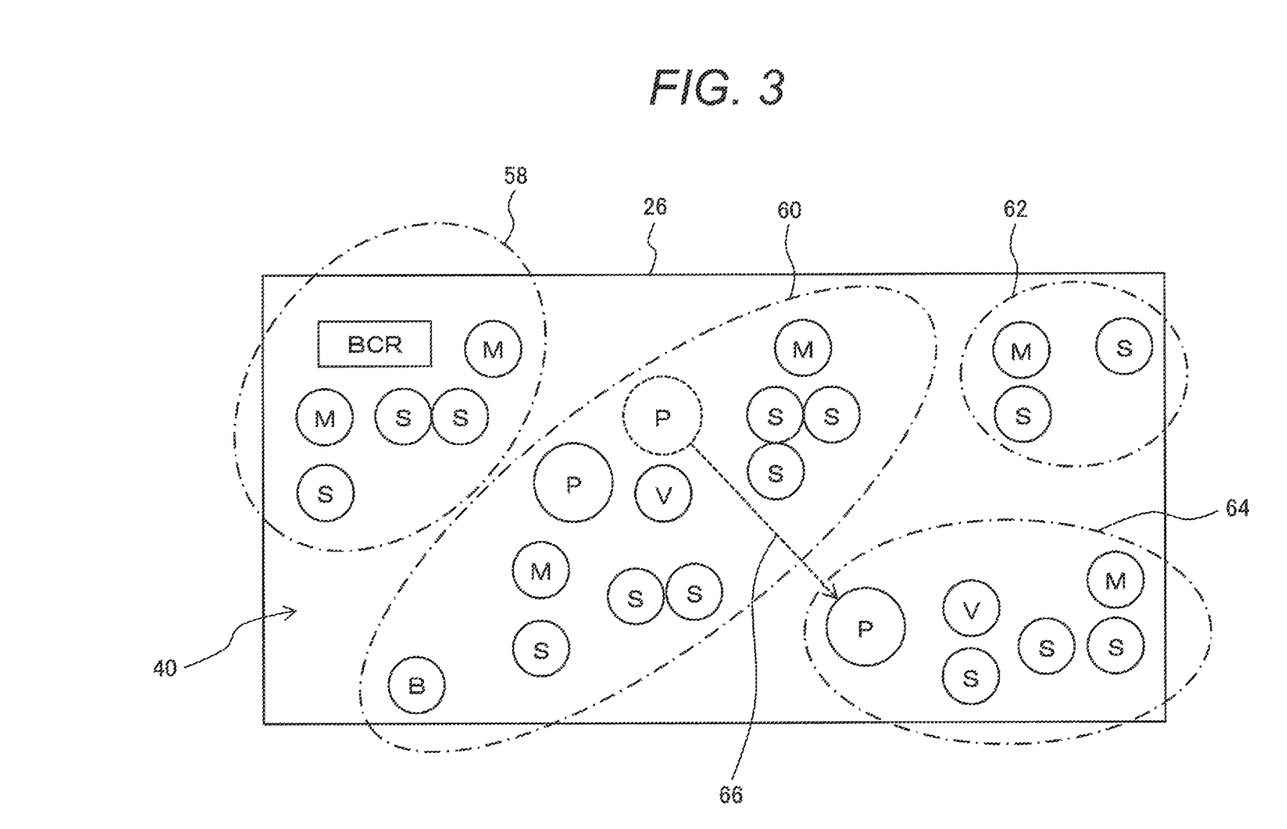
FIG. 3 is a diagram showing grouping of multiple instruments.

FIG. 3 exemplifies the arrangement of the multiple instruments 40 included in the device 26. In an example shown in FIG. 3, the multiple instruments 40 are multiple sensors S, multiple motors M, multiple pumps P, multiple electromagnetic valves V, a button B, and a barcode reader BCR. For the instruments, four instrument groups 58, 60, 62, and 64 are defined. Specifically, four local units are associated with the multiple instruments 40. In the example shown in FIG. 3, each of the instrument groups is defined for instruments close to each other in distance. Specifically, the four instrument groups 58, 60, 62, and 64 are defined in a distributed manner in the device 26. Each of the local units is installed for and close to a respective one of the instrument groups 58, 60, 62, and 64. The four local units are connected to the center unit by network cables. As a result, multiple network cables are installed in a housing of the device 26.

In FIG. 3, as indicated by a reference numeral 66, when a pump P belonging to the instrument group 60 is moved to the other instrument group 64, or the allocation or administration is changed, it is sufficient if only information of the pump P is modified in the conversion table, and the sequence data does not need to be modified. Obviously, when details of control of the pump P are to be modified due to the change in the arrangement of the pump P, the sequence data is modified. Even in this case, since the modification is executed based on definitions of ethical names, an operation for the modification is easily executed.

Figure 4:
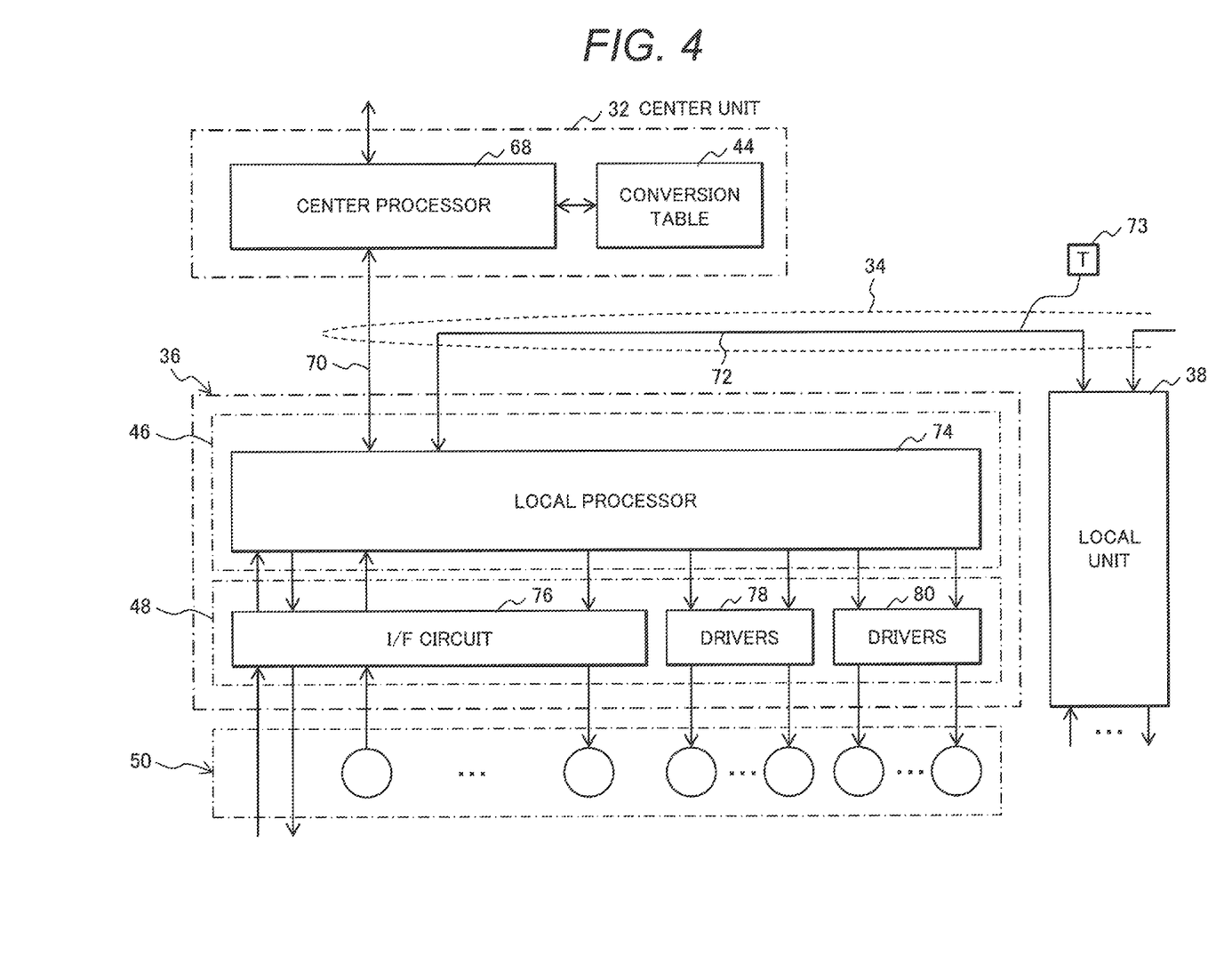
FIG. 4 is a block diagram showing an example of a configuration of a center unit and a local unit shown in FIG. 2.

FIG. 4 exemplifies a specific configuration of the center unit 32 and a specific configuration of the local unit 36. Those configurations are described below in detail.

The center unit 32 is configured as, for example, an electronic circuit board. A center processor 68, a memory, and the like are mounted on the board. The center processor 68 functions as generating means. For example, the center processor 68 is composed of one or multiple devices such as a CPU and an FPGA. The conversion table 44 is stored in the memory. Details of the conversion table 44 can be modified via the center processor 68. As described above, the center processor 68 references the conversion table 44 and generates, from the sequence data, multiple instruction strings to be given to the multiple local units 36 and 38. Specifically, the multiple instruction strings are given in the form of many packets to the multiple local units 36 and 38 via the internal network 34. The internal network 34 is physically formed using multiple network cables 70 and 72 installed between the multiple units. In the present embodiment, a token 73 is used to circulate the right to access between the multiple units. Instead of the token, polling or the like may be used.

As described above, the local unit 36 includes a local controller board 46 and an I/O board 48. The local controller board 46 includes a local processor 74 functioning as a local controller. For example, the local processor 74 is composed of one or multiple devices such as a CPU and an FPGA. High-speed packet communication is executed between a communication module included in the center processor 68 and a communication module included in the local processor 74. Similarly, high-speed packet communication is executed between the center processor 68 and the local processor 74.

The I/O board 48 includes an I/F circuit 76, a driver group 78, a driver group 80, and the like in the example shown in FIG. 3. Drivers included in the driver group 78 are, for example, electronic circuits for giving driving pulse strings to pulse motors. Drivers included in the driver group 80 are, for example, DC/AC drivers (electronic circuits) for giving driving signals to the pump and the like. The instrument group 50 includes, for example, the sensor, the switch, a button, the motor, the pump, the electromagnetic valve, and the like. In the instrument group 50, a signal line through which a signal generated by another device is transferred and a signal line through which a signal is transferred to the other device may be included. The signal lines have the same characteristics as a general instrument in the sense of input and output targets. A channel or port among channels and ports of the local processor 74 is not used, depending on the configuration of the instrument group 50. In this case, when a general-purpose I/O board is used as the I/O board 48, a channel or a port among channels and ports of the I/O board 48 is not used.

According to the aforementioned configuration, since an instruction is interpreted and executed by the local processor 74, a large amount of control information to be used to directly control a large number of instruments does not need to be transmitted to the internal network 34. In addition, even when a local unit needs to be added and installed, the local unit can be easily connected to the internal network 34. Even when the administration of instruments is changed due to the addition of the local unit, it is sufficient if only the conversation table is rewritten.

When the local unit 36 is installed near the instrument group 50 managing the local unit 36, multiple signal lines between the local unit 36 and the instrument group 50 can be reduced in length and simplified as entire wirings. This leads to an advantage or a reduction in a load of wiring work. Since individual signal lines do not need to be arranged across a long distance within the device, the inside of the device can be simplified. In addition, since the platform that is common to the devices is achieved, a burden applied upon the development of the devices can be significantly reduced.

Figure 5:
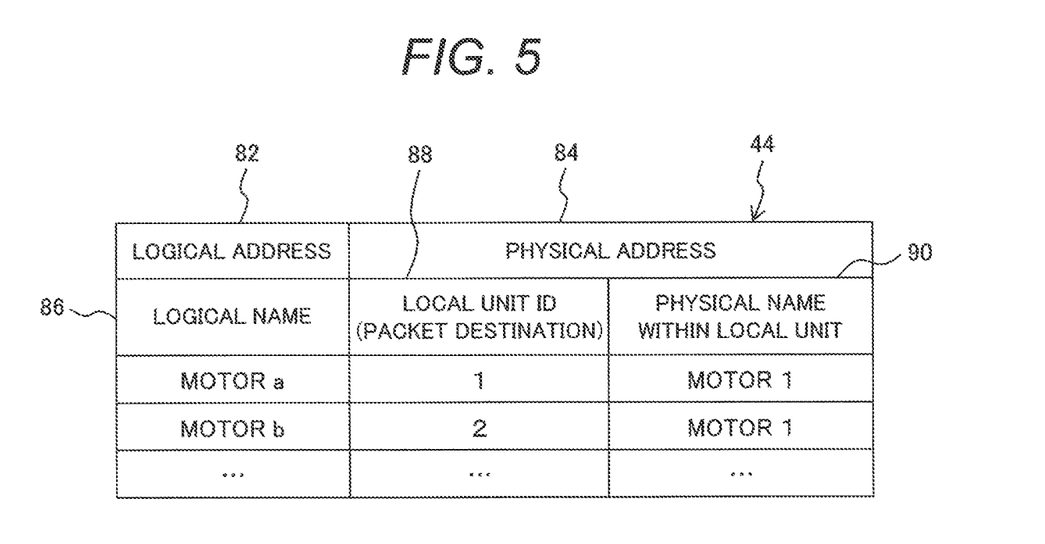
FIG. 5 is a diagram showing an example of a conversion table.

FIG. 5 shows an example of the conversation table. The conversation table 44 is a table to be used to manage correspondence relationships between logical addresses 82 and physical addresses 84. Entities of the logical addresses 82 are logical names 86, while entities of the physical addresses 84 are combinations of local unit IDs 88 and physical names 90 within the local units. The conversion table 44 is referenced upon the identification of the physical addresses 88 from the logical addresses 82 and upon the identification of the logical addresses 82 from the physical addresses 84. Instead of the conversion table 44 shown in FIG. 5, a table having another structure or information corresponding to the table may be used. For example, in a system in which a sequence program needs to be compiled, the conversion table 44 may be referenced upon the compilation.

Figure 6:
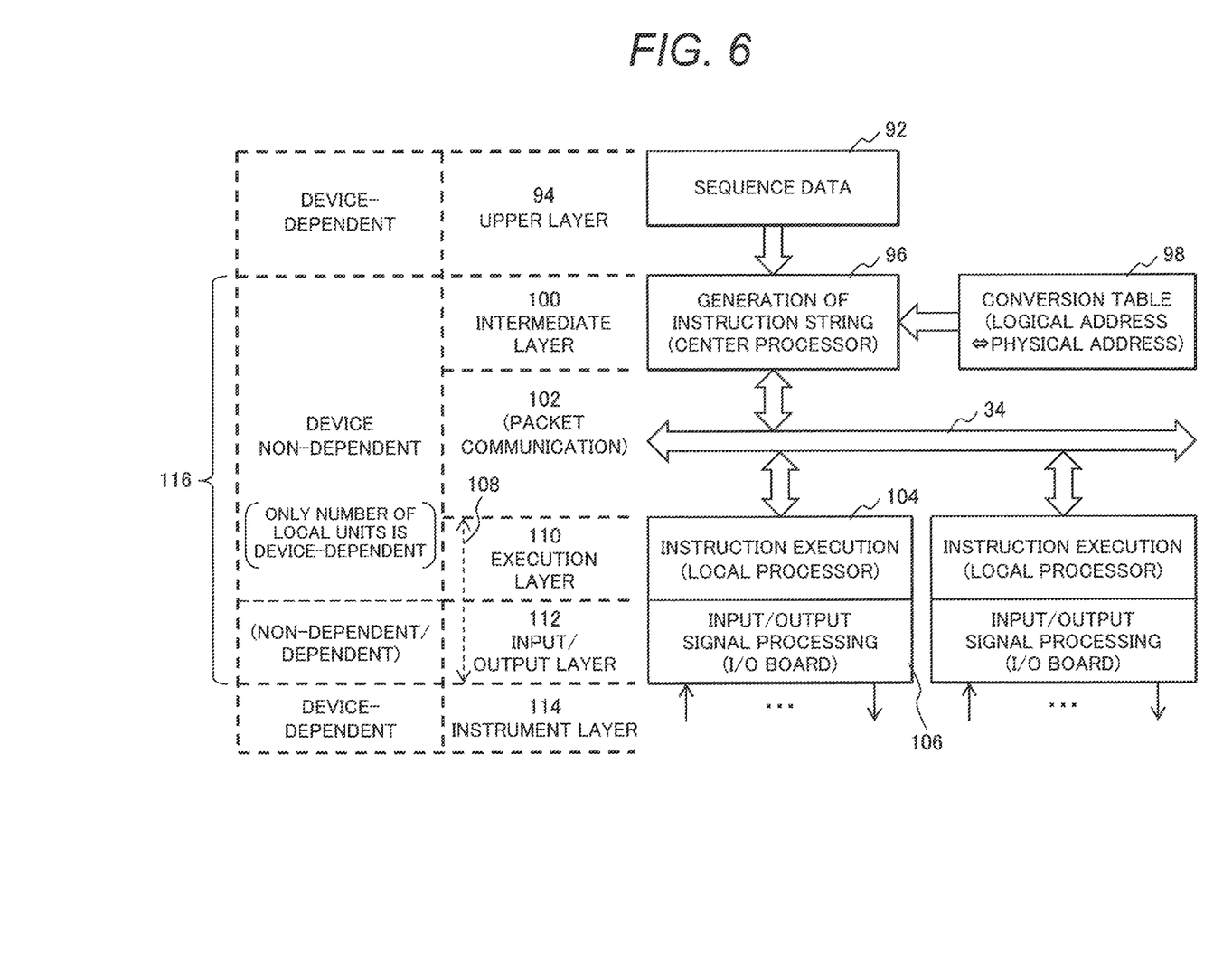
FIG. 6 is a diagram showing a platform having a layered structure.

FIG. 6 shows a layered structure. An upper layer 94 is a layer corresponding to sequence data 92. Basically, the sequence data 92 is generated for each of the devices, or the upper layer 94 has device-dependent characteristics.

An intermediate layer 100 is a layer corresponding to the generation of an instruction string. This layer can be referred to as middleware. Upon the generation of an instruction string, a conversion table 98 is referenced. Details of the conversion table 98 have device-dependent characteristics. For the devices, the same processor can be used. Specifically, hardware of the center unit can be made common to the devices. Thus, it can be said that the intermediate layer 100 has device non-dependent characteristics. A reference numeral 102 indicates a communication layer in which packet communication is executed, and the communication layer has device non-dependent characteristics.

A reference numeral 108 indicates a lower layer between the intermediate layer and an instrument layer 114. The lower layer is composed of an execution layer 110 and an input/output layer 112. The execution layer 110 is a layer corresponding to instruction execution 104 by the local processors. Hardware configurations of the local processors are made common to the devices, or the execution layer 110 has device non-dependent characteristics. The numbers of local units depend on the devices. As described above, the numbers of local units are extremely easily increased or reduced in the configurations of the devices. The input/output layer 112 is a layer corresponding to input/output signal processing 106 by the I/O boards. When the I/O boards are configured as general-purpose boards, the input/output layer 112 has device non-dependent characteristics. When the I/O boards are configured as dedicated boards, the input/output layer 112 has device-dependent characteristics. When multiple types of standard I/O boards are prepared and an I/O board to be actually used is selected from among the standard I/O boards, the input/output layer 112 has device non-dependent characteristics.

In each of the devices, a layered structure for control is built between the sequence data 92 (the device-dependent upper layer 94) and multiple instruments (device-dependent instrument layer 114) and is a common platform 116. Even when the input/output layer 112 has device-dependent characteristics, commonality between the devices is confirmed in basic specifications of the input/output layer 112, and it can be understood that the common platform 116 includes the layers up to the input/output layer 112.

Figure 7:
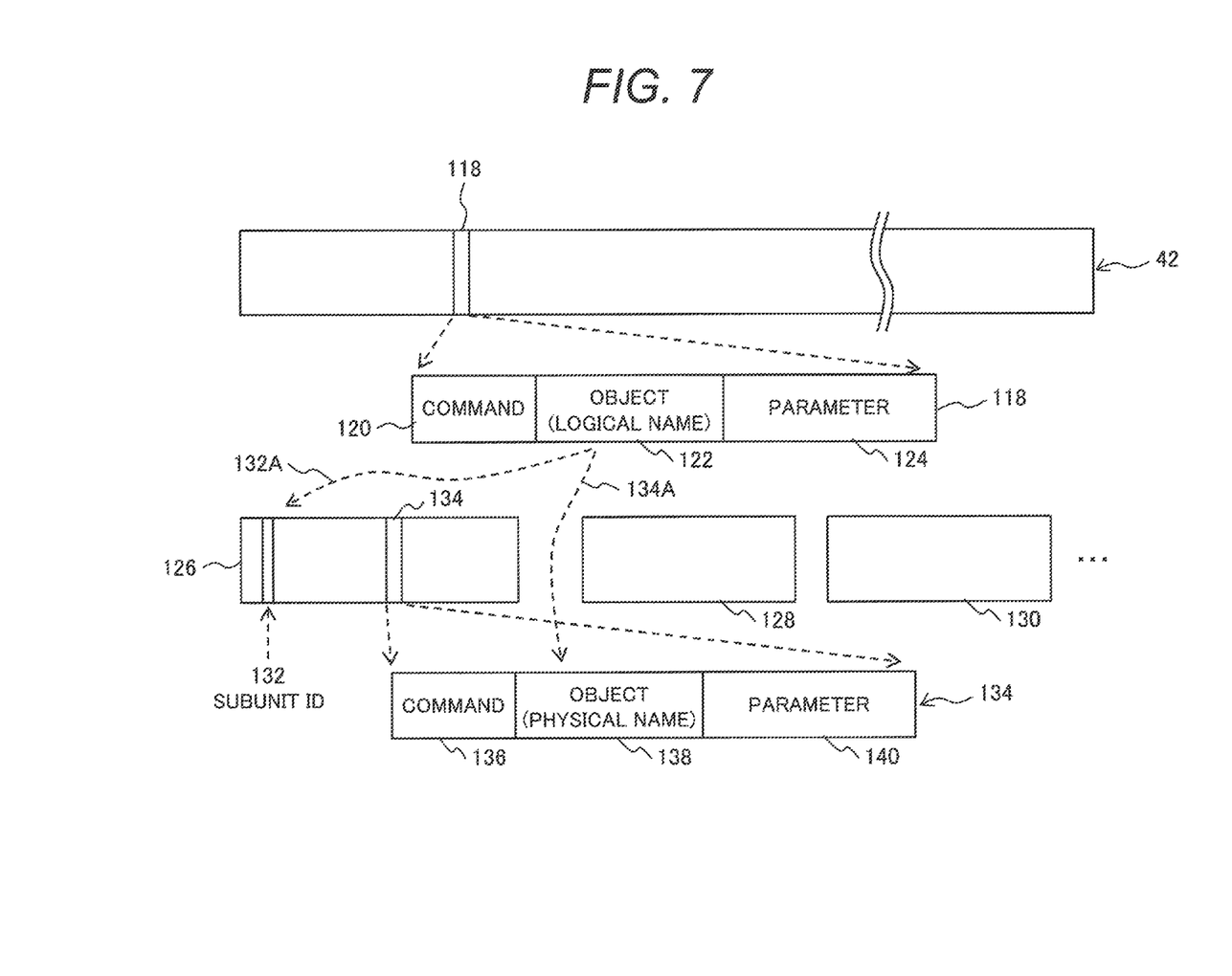
FIG. 7 is a diagram showing the generation of a packet based on sequence data.

FIG. 7 shows the generation of a packet string based on the sequence data. The sequence data 42 includes multiple instructions. FIG. 7 exemplifies a breakdown of an instruction 118. In this example, the instruction 118 includes a command 120, an object 122 to be controlled, and a parameter 124 such as coordinate information. The object 122 is identified by a logical name. Based on the sequence data 42, multiple packets 126, 128, and 130 are generated. When attention is paid to the packet 126, a local unit ID 132 is included in header information of the packet 126. The header information forms a packet destination. As indicated by a reference symbol 132A, the local unit ID is identified from a logical name by referencing the conversion table. In the shown example, the packet 126 includes an instruction 134 that includes a command 136, an object 138, and a parameter 140. The object 138 is identified by a physical name. As indicated by a reference symbol 134A, the physical name is identified from the logical name by referencing the conversion table. The command 136 may be the same as the aforementioned command 120 or may be configured in a different expression form from the aforementioned command 120. Similarly, the parameter 140 may be the same as the aforementioned parameter 124 or may be configured in a different expression form from the aforementioned parameter 124. The packet generation shown in FIG. 7 is an example and may be executed in another manner. For example, a single instruction may be carried by multiple packets. The sequence data may be broadcast by the center unit to the multiple local units.

Figure 8:
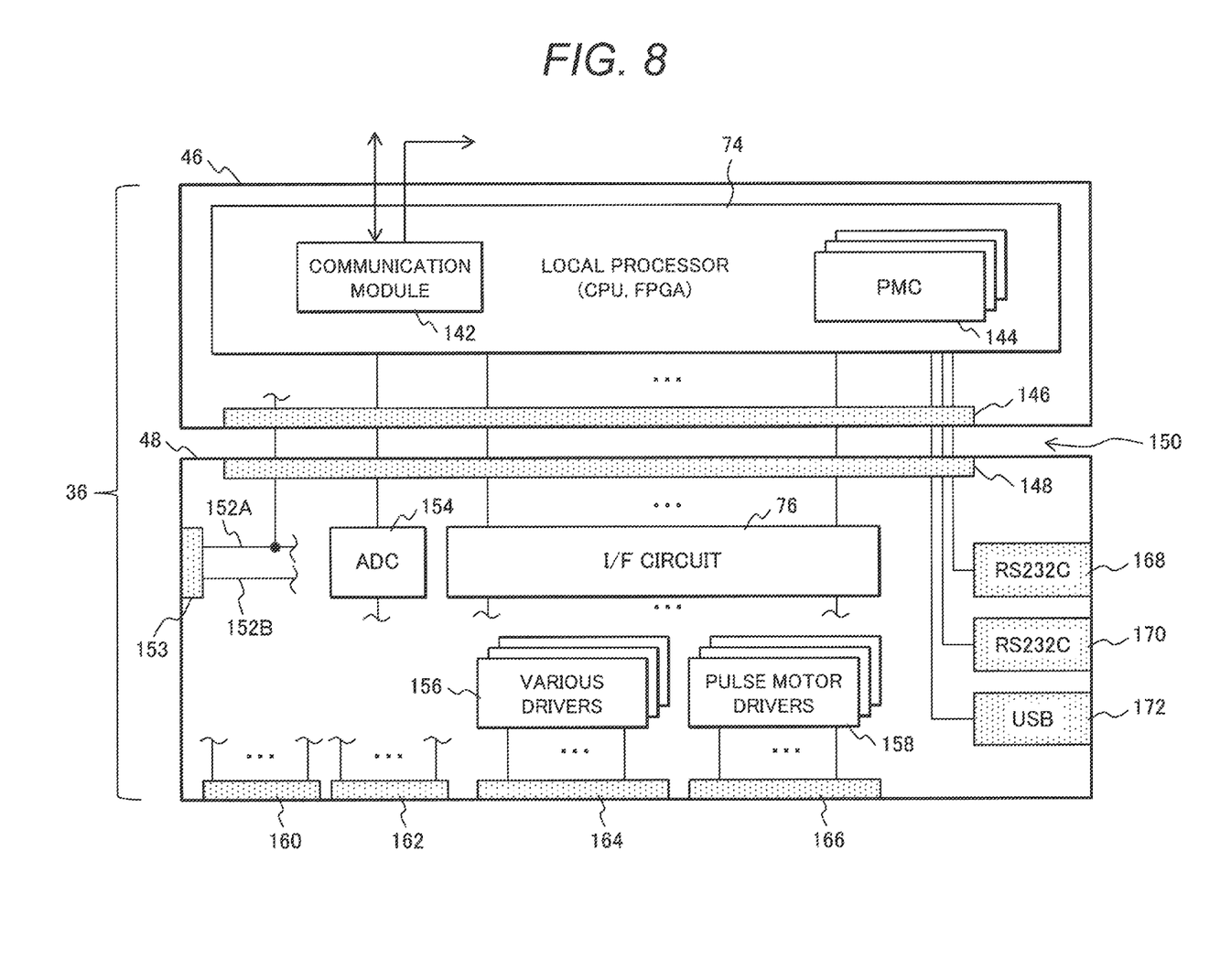
FIG. 8 is a diagram showing an example of a configuration of an I/O board (relay board).

FIG. 8 shows an example of a specific configuration of the local unit. Note that configurations that are the same as those described above are indicated by the same reference symbols as described above, and a description thereof is omitted.

The local unit 36 includes the local controller board 46 and the I/O board 48. The local controller board 46 includes the local processor 74 functioning as a local controller. As described above, the local processor 74 is composed of the one or multiple devices such as the CPU and the FPGA. The local processor 74 includes a communication module (or communication function) 142. The communication module 142 communicates a packet between the center unit and a communication module included in another local unit. The local processor 74 includes multiple pulse motor control (PMC) modules (or PMC functions) 144. The local processor 74 includes a large number of input/output terminals that are connected to a connector 146 via internal wirings.

The I/O board 48 includes a connector 148. The connector 148 is connected directly to the connector 146 or connected indirectly to the connector 146 via flat cables 150 or the like. In the shown configuration example, all signals excluding network signals and to be output from the local processor 74 are output to an external via the I/O board 48. In addition, all signals input from the external are transmitted to the local processor 74 via the I/O board 48. Regarding this meaning, it can be said that the I/O board 48 is an input/output board for the local controller board 46. In the shown example, multiple DC powers (for example, 5V and 24V) 152A and 152B are supplied to the I/O board 48 from an external via a connector 153. Part (for example, 5V) of the power is supplied to the local controller board 46 via the connectors 146 and 148. An ADC 154 is a circuit for converting an analog signal from, for example, a temperature sensor to a digital signal. Multiple ADCs may be installed. Multiple DACs may be installed. An I/F circuit 76 is a circuit for converting levels of input and output signals or the like. Signals (signals at a rated level) output from the local processor 74 are converted by the I/F circuit 76 to signals (amplified signals or the like) to be actually given to the instruments. Further, signals input from the instruments are converted by the I/F circuit 76 to signals (signals of rated levels) to be given to the local processor 74. In addition, the I/O board includes various driver groups (for example, a DC/AC driver) 156 and multiple pulse motor drivers 158.

The I/O board 48 includes connectors 160, 162 to be connected to the instruments, a connector 164 to be connected to specific instruments such as the pump, and a connector 166 connected to the pulse motors and includes RS-232 connectors 168 and 170 and a USB connector 172. Barcode readers may be connected to the RS-232 connectors 168 and 170 when needed.

According to the I/O boards having the aforementioned standard functions implemented therein, a probability at which the same I/O boards can be used between the devices can be increased. If it is founded that a driver for a pump is required in a certain I/O board, a destination to which the pump is to be connected can be changed to another I/O board, and a driver mounted on the other I/O board can be used. It is desirable that the instruments be grouped in consideration of effective use of resources.

Figure 9:
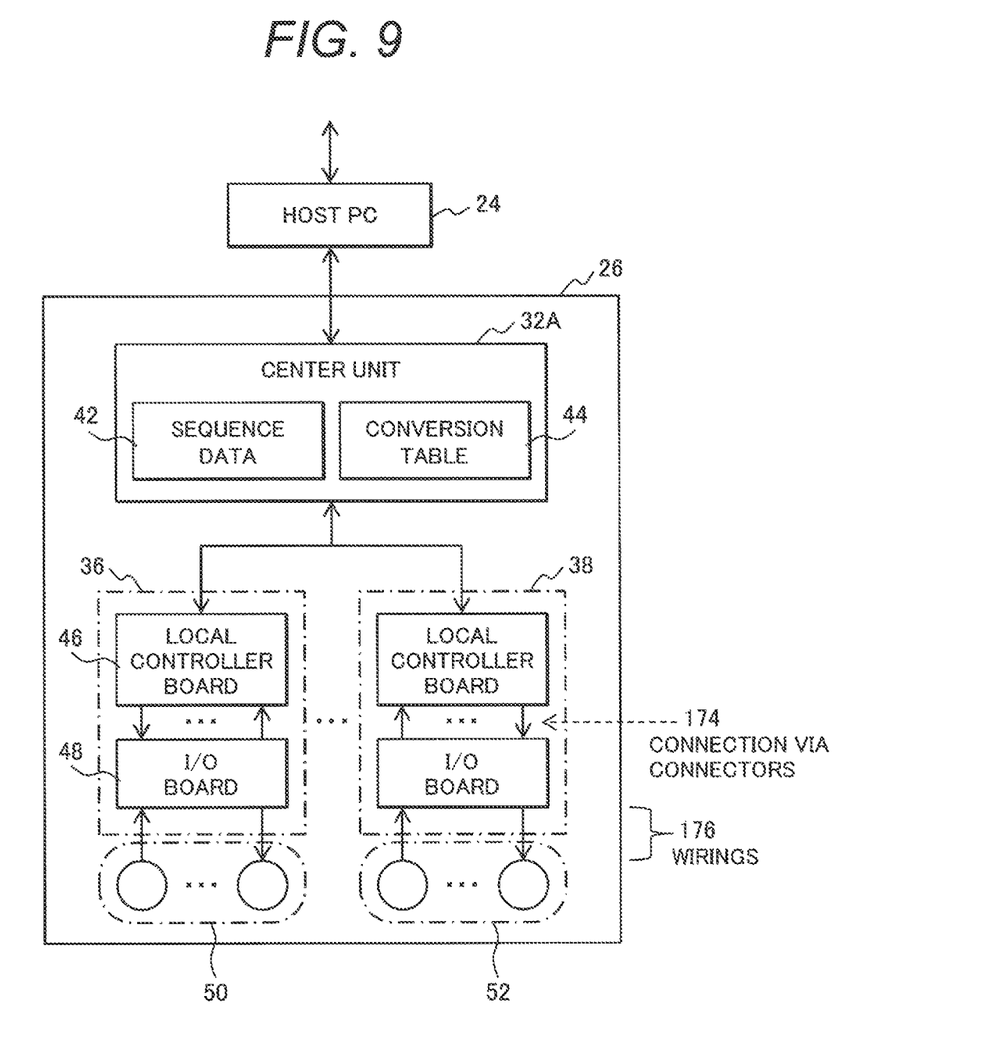
FIG. 9 is a diagram showing a modified example.

FIG. 9 shows a modified example. A sample processing system includes only a single device 26. The device 26 includes a center unit 32A and the multiple local units 36 and 38. In the example shown in FIG. 9, the center unit 32A includes the sequence data 42 and the conversion table 44. Specifically, the center unit 32A has the functions of the main unit 30 and the center unit 32 shown in FIG. 2. Each of the local units 36 and 38 includes a local controller board 46 and an I/O board 48, which are connected to the instrument groups 50 and 52. In the modified example, the local controller board 46 and the I/O board are connected to each other by a pair of connecters as indicated by a reference numeral 174. In the modified example, since the local units 36 and 38 can be installed near the instrument groups 50 and 54, respectively, wirings 176 can be simplified. Note that only a single local unit may be installed in the device 26. It is desirable that a platform common to two or more devices among multiple devices forming a sample processing system be used. Especially, it is desirable that a platform common to all devices forming a sample processing system be used.

Figure 10:
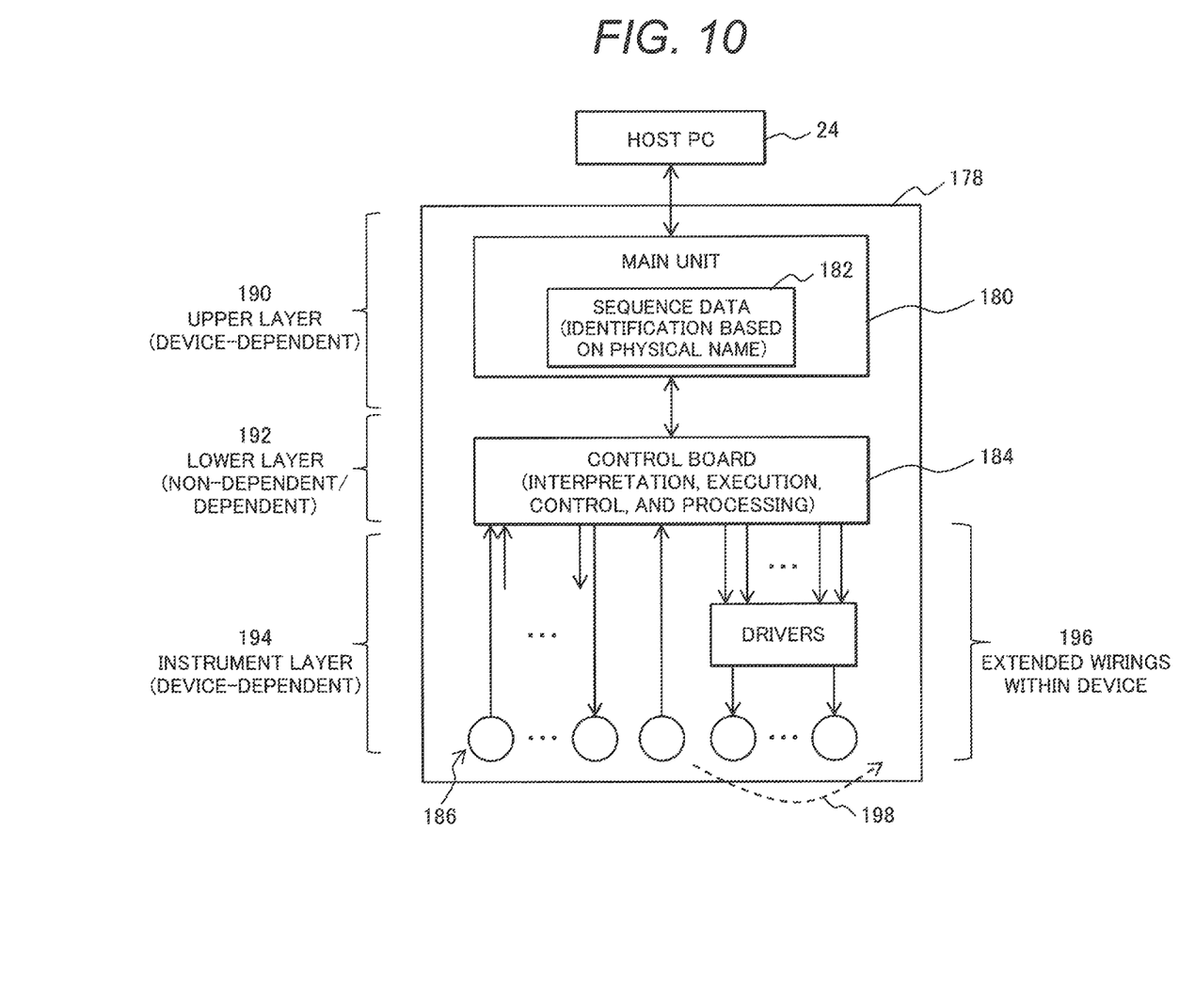
FIG. 10 is a diagram showing a comparative example.

FIG. 10 shows a comparative example. A device 178 is connected to a host PC. The device 178 includes a main unit 180 and a control board 184. The main unit 180 includes sequence data 182. Targets to be controlled in accordance with instructions included in the sequence data 182 are identified by physical names. The control board 184 interprets and executes the individual instructions included in the sequence data 182. Specifically, the control board 184 directly controls instrument groups 186 and receives and processes signals from the instrument groups 186. A driver group 188 is installed between the control board 184 and the instrument groups 186.

In the comparative example, the main unit 180 corresponds to an upper layer 190, and the instrument groups 186 correspond to an instrument layer 194. Each of the layers 190 and 194 has device-dependent characteristics. The control board 184 corresponds to a lower layer 192. When specifications of the control board 184 are shared between devices, the lower layer 192 has device non-dependent characteristics, a large number of functions are concentrated on the control board 184, and it is difficult to flexibly support a change in specifications of the devices or the like. When the control board 184 is a dedicated product, the lower layer 192 has device-dependent characteristics. Specifically, a dedicated control board needs to be prepared for each device.

In the comparative example, long wirings need to be installed between the control board 184 and the instrument groups 186 and are complex within the device, as indicated by a reference numeral 196. In addition, when multiple control boards are used, and a destination to which a certain instrument is to be connected is changed as indicated by a reference numeral 198, a physical address (physical name) is changed, the sequence data needs to be rewritten, and this is cumbersome. When a destination to which a certain instrument is to be connected is changed in a single control board, the same problem may occur. In the comparative example, even when specifications of the control board are made common to multiple devices, the flexibility and the extensibility, which are obtained in the present embodiment, are not obtained.

According to the present embodiment, a burden on the development of individual devices is significantly reduced. In addition, even when specifications of the devices are changed, it is possible easily support the changes in the specifications of the devices. In addition, even when specifications of devices are expanded, it is possible to easily support the expansion in the specifications of the devices without an exceptional burden. The general versatility, the flexibility, and the extensibility are great advantages obtained by the common platform.

Even in the case where a physical name is described in an instruction included in the sequence data (or when the conversion table is not used), when the layered structure is used, a certain advantage can be obtained. Even in the case where the layered structure is not used, when a configuration in which the local units (subunits) individually interpret and execute instructions is used, an advantage or the simplification of wirings can be obtained.

The invention claimed is:

1. A sample processing system comprising at least one device including multiple instruments for processing a sample,
   wherein at least one instrument group is defined for the multiple instruments,
   wherein the device includes:
   a center unit configured to generate an instruction string based on sequence data; and
   a local unit connected to the instrument group and configured to control the instrument group by executing an instruction string whose destination is the local unit,
   wherein the center unit includes:
   a conversion table to be used to identify, for each logical name identifying an instrument to be controlled, a local unit and a physical name corresponding to the logical name; and
   generating means configured to generate the instruction string by determining, based on the conversion table, a local unit configured to transmit an instruction based on a logical name within the instruction included in the sequence data and converting the logical name included in the instruction to a physical name.

2. The sample processing system according to claim 1,
   wherein multiple instrument groups are defined for the multiple instruments,
   wherein the device includes multiple local units corresponding to the multiple instrument groups, and
   wherein the center unit generates multiple instruction strings to be given to the multiple local units based on the sequence data.

3. The sample processing system according to claim 2,
   wherein the device includes an internal network installed between the center unit and the multiple local units, and
   wherein the multiple instruction strings are transmitted from the center unit to the multiple local units via the internal network.

4. The sample processing system according to claim 3,
   wherein packet communication is executed between the center unit and the multiple local units via the internal network, and
   wherein the generating means determines a packet destination based on a logical name included in an instruction included in the sequence data.

5. The sample processing system according to claim 1,
   wherein the local unit includes:
   a local control board having mounted thereon a local processor configured to execute an instruction string whose destination is the local unit and that has been transmitted from the center unit; and
   an I/O board connected to the local controller board and configured to generate a signal string to be output to the instrument group in accordance with control by the local processor and process a signal string received from the instrument group.

6. The sample processing system according to claim 5, further comprising multiple devices,
   wherein each of the devices includes the center unit and includes the local controller board and the I/O board as the local unit,
   wherein the multiple center units included in the multiple devices have the same hardware configuration, and
   wherein the multiple local controller boards included in the multiple devices have the same hardware configuration.

7. The sample processing system according to claim 6,
   wherein the multiple I/O boards included in the multiple devices have the same hardware configuration.

8. The sample processing system according to claim 5,
   wherein the local controller board includes a first connector, and
   wherein the I/O board includes a second connector connected directly to the first connector or connected indirectly to the first connector via a cable.

9. The sample processing system according to claim 2,
   wherein the multiple local units are installed at positions corresponding to the instrument groups in a distributed manner in the device, and
   wherein network cables connecting the center unit to the multiple local units are installed in the device.

10. A control method to be executed for each of multiple devices in a sample processing system including the multiple devices for processing a sample,
    wherein each of the devices includes a center unit configured to generate an instruction string based on sequence data, a local unit connected to an instrument group of multiple instruments, and an internal network for communication executed between the center unit and the local unit, wherein an instrument to be controlled is identified by a logical name of an instruction included in the sequence data, wherein the control method comprises the steps of:

causing each of the center units included in the devices to generate the instruction string by determining a local unit configured to transmit an instruction based on a logical name within the instruction included in the sequence data and converting the logical name included in the instruction to a physical name; and causing each of the local units included in the devices to execute an instruction string whose destination is the local unit and control the multiple instruments.

* * * * *